Nov. 28, 1961   C. C. LAMAR   3,010,693
LOCKING TYPE GAS VALVE
Filed Jan. 7, 1958
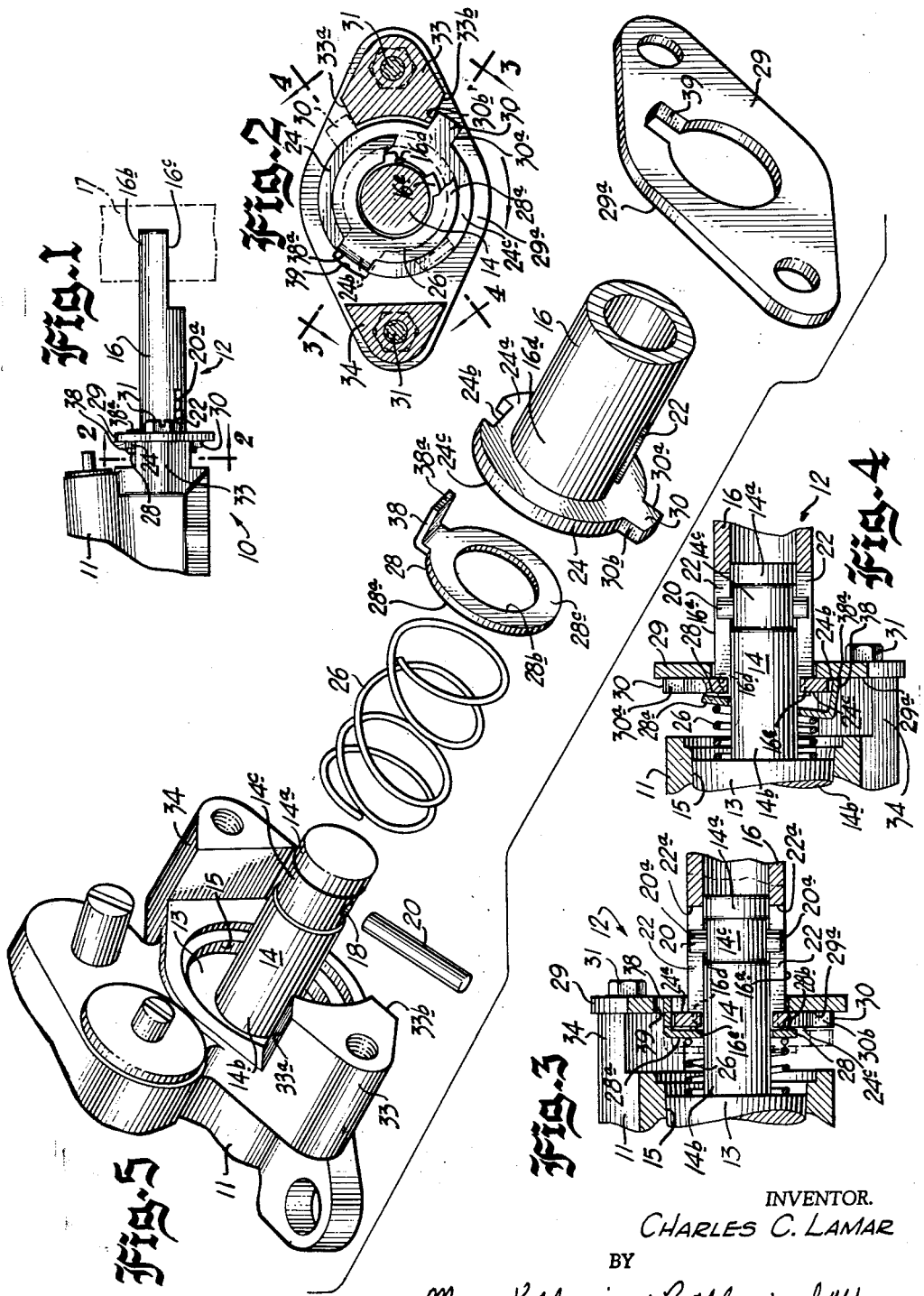
INVENTOR.
CHARLES C. LAMAR
BY
Mason, Kolehmainen, Rathburn and Wyss.
ATTORNEYS.

United States Patent Office 3,010,693
Patented Nov. 28, 1961

3,010,693
LOCKING TYPE GAS VALVE
Charles C. Lamar, Chicago, Ill., assignor to Harper-Wyman Company, Chicago, Ill., a corporation of Illinois
Filed Jan. 7, 1958, Ser. No. 707,559
5 Claims. (Cl. 251—96)

The present invention relates to gas valves and has for its primary object the provision of a new and improved locking type gas valve.

A further object of the present invention is to provide a new and improved locking type gas valve which may be manufactured and assembled readily and economically.

A still further object of the present invention is to provide a new and improved locking type gas valve having a pair of telescopically related and axially relatively movable stem portions which are drivingly interconnected by means minimizing binding, wobble and backlash between the stem portions and including also locking means actuated upon relative axial movement and so constructed and arranged as to reduce frictional forces between the stem portions and between the stem and the stationary supporting and locking means associated therewith.

A further object of the present invention is to provide a new and improved locking type gas valve including a pair of telescopically and axially relatively movable stem portions so constructed and arranged that they can be assembled to form a unitary assembly.

A still further object of the present invention is the provision of a new and improved locking type gas valve having a locking plate or washer separate from associated stem portions and so constructed and arranged that the stem portions are returned to normal unactuated position corresponding to the locked position of the valve independently of the return of the locking washer to its locking position.

In brief, the valve of the present invention includes a valve body and a movable control element such as a valve plug rotatably mounted within a chamber in the body for movement into its various positions by a valve stem. The valve stem of the present invention comprises two stem portions telescopically related so as to permit axial relative movement between them. More specifically, one of the portions, i.e., an inner one connected to the valve plug, is generally cylindrical in shape and the other and outer stem portion is tubular and slidably mounted on the first. A control knob is mounted on the second stem portion for rotating the stem assembly and plug. The two stem portions are dimensioned so as to permit sliding movement therebetween with little or no shake, wobble or backlash between them. They are drivingly interconnected whereby turning of the outer portion imparts rotary movement to the inner portion by means of a balanced type of drive constituted by a pin or slot drive. The pin is mounted on the inner stem portion and has its opposite ends extending into closely fitting diametrically opposed slots in the outer stem portion. The drive pin is located some distance out from the inner end of the outer stem portion so that the drive is not at the inner end of the outer portion. The locking means includes a locking washer relatively loosely mounted on the first stem portion. The washer is generally circular and has an axial opening through which the first stem portion loosely fits. At its outer periphery the washer is provided with an axially extending tongue or lug adapted to fit into a locking recess on the stationary part of the valve, for instance on an end cap or plate through which the stem extends. The locking washer is driven by a second plate or washer secured to the inner end of the outer stem portion and abutting against the end plate and having a radially extending lug determining the limit positions of the valve. The locking washer is biased toward its locking position and the telescopic stem portions are biased into their extended position by a spring surrounding the inner stem portion, which spring is also used to hold the valve plug in its seat. The valve is unlocked by moving the outer stem portion inwardly to move the locking lug or tongue out of the locking recess in the end plate and then slightly turning the valve. After the valve has been turned the locking tongue remains out of the recess and the valve handle and outer stem part are returned to their initial positions corresponding to the locked position. Thereafter, upon movement of the valve back into its off position, the locking washer alone is moved by the spring means to engage the lock tongue in its associated locking recess.

Other objects and advantages of the present invention will become apparent from the following description of an embodiment thereof, in the course of which reference is had to the accompanying drawings in which:

FIG. 1 is a fragmentary side elevational view of a valve constructed in accordance with the present invention;

FIG. 2 is an enlarged transverse sectional view taken along line 2—2 of FIG. 1 with the valve in its off and locked position, partly broken away, and with the plug biasing spring omitted;

FIG. 3 is a fragmentary axial sectional view taken substantially along line 3—3 of FIG. 2;

FIG. 4 is a sectional view taken along line 4—4 of FIG. 2, illustrating the valve in its full on position; and FIG. 5 is an enlarged fragmentary, exploded, perspective view of the valve.

Referring now to the drawings and particularly to FIG. 1, there is illustrated a valve 10 including a valve body or casing 11 and a valve plug 13 (see FIGS. 3, 4 and 5) rotatably mounted within a valve chamber 15. The plug is adapted to the rotated by a stem assembly 12 constructed in accordance with the present invention and to which is attached a knob 17 illustrated in phantom. The valve may be of a type described in the copending Burdett application Serial No. 670,975, filed July 10, 1957, and the copending Lamar et al. application Serial No. 671,048, filed July 10, 1957, and now abandoned, both of which applications are assigned to the same assignee as the present application and to which further reference may be had for details not shown or described herein. However, the present invention should not be interpreted as being limited to the particular type of structure or function described in the above applications since the present invention is susceptible to broad application and may be used with other types of valves.

The stem assembly 12 includes two telescopically related portions 14 and 16 which are rotatable in unison and which are axially movable relative to each other. The first and inner stem portion 14 has one end 14b fixedly attached to the valve plug 13 and its other and outer end 14a is disposed telescopically within the inner end 16a of a second and outer and tubular stem portion 16. The latter has a flat 16c at its outer end 16b for attachment of the knob 17. In order to reduce wobble or shake between the stem portions the outer stem portion 16 is dimensioned relatively closely to fit about the inner stem portion. Also, the bearing between the two portions is relatively long and actually there are two bearing portions separated by an annular groove 14c, the purpose of which will be described shortly.

The driving connection between the two stem portions is constructed and arranged to provide what might be called a balanced drive and one producing but little, if any, binding between the stem portions so that the axial relative movement between the two is not likely to be prevented in use. The driving connection includes a cylindrical pin 20 fixedly mounted as by a press fit in a diametrical bore 18 in the inner valve stem portion, which bores extends through the annular grooved portion 14c of the inner stem portion. The two outer ends 20a of the pin project radially beyond the inner stem portion and fit relatively closely but movably within opposed slots 22 in the outer stem portion 16. The slots are of some axial length and the pin is disposed some distance from the inner end of the outer stem portion so that the drive is effected not at the end but, rather, some distance from the end of the outer tubular portion. This results in a decreased possibility of binding between the two stem portions. The pin is driven into place after assembly of the stem portions and in order to eliminate possible binding between the two as a result of metal being deformed from either the pin or the inner stem portion, some clearance is provided by the annular groove 14c.

In accordance with a further feature of the present invention, the stem portions are held in assembled relation by the pin 20 and a limit position determining washer or plate indicated by the reference character 24. This washer is secured to the inner end of the outer portion so as to turn with it. The securing is effected as by staking the reduced diameter inner end of the outer stem portion 16 and upon which the washer 24 is mounted, the staking providing a short axially extending projection 16e. The washer 24 is provided with a radially extending tongue 30, the opposite sides 30a and 30b of which are adapted to engage the stop defining shoulders 33a or 33b on casing portion 33, as shown in phantom and full lines in FIG. 2. In FIG. 2, the full line position indicates the off position and the phantom line indicates the full on position.

An additional driving connection between the outer stem portion and washer 24 is provided by opposed inwardly extending tongues 24e on the washer which extends into the inner end portions of the slots 22. The tongues have a length somewhat shorter than the depth of the slot so that there is no likelihood of binding between the washer and the inner stem portion. The slots 22 have a length such that inward movement of the outer stem portion is limited by engagement of the slot ends 22a with the pin 20. In assembly, the washer 24 is staked onto the outer stem portion 16, and then the latter, the lock washer 28 and spring 26 are placed on the inner stem portion 14 and the drive pin 20 is driven into place. Thus, once assembled, the parts remain a unitary assembly.

The stem portions are biased toward their extended positions by a spring 26 which acts on the outer stem portion through a locking washer 28, which will be described in greater detail shortly, and the position determining washer 24. The inner end of the spring 26 bears against the valve plug thereby to hold the valve plug seated in its chamber. The outer end bears aaginst the locking washer and forces it and the outer stem portion outwardly. The outward movement of the outer stem portion and other parts is limited by an end cap or end plate 29 secured as by the screws 31 to the valve casing and against which the outer surface of washer 24 rides. It should perhaps be mentioned that the shoulders 33a and 33b are provided by milling out an end portion of the valve casing thereby to leave the outwardly extending projection portion 33 and another diametrically oppositely located projection 34 through which the screws 31 extend and which provide space for the locking and position limiting washers.

The locking means of the present invention includes the previously referred to locking washer 28. This washer is provided with an annular portion 28a centrally of which is located an opening 28b of a size somewhat larger than the inner portion 14b of the inner stem portion 14. The fit should be such that the locking plate 28 is readily movable from the locking position of FIG. 3 to the unlocked position of FIG. 4. The actual locking is effected by an axially forwardly extending tongue 38 at a peripheral portion of the washer. This tongue in the locked position of the valve extends into a recess 39 formed in the end plate 29, as shown best in FIGS. 2 and 3. In the locked position, the locking washer 28 abuts against the staking 16e.

The locking washer, while loosely surrounding the inner stem portion, is constrained to rotate with the outer stem portion. This is accomplished by providing the position limiting washer 24 with a peripheral recess 24b through which the locking tongue 38 extends. The diametrical relationship should be such that the tongue is not movable out of the recess while at the same time the locking plate is axially movable between the locked and unlocked positions. The axial length of tongue 38 is such that it is not movable entirely out of recess 24b whereby the locking washer is permanently in driven relation to washer 24.

In order to unlock the valve it is necessary only to move the outer stem portion axially inwardly an amount sufficient to remove the tongue 38 from the locking aperture 39 (substantially to the position shown in phantom in FIG. 3) and to turn the valve slightly so that the end 38a of the locking tongue is moved into abutting engagement with the inner surface 29a of the end plate 29, as shown in FIG. 4. Once moved into this position ad the control knob 17 released, the spring 26 returns the outer stem portion to the position in which it is shown in full lines in FIG. 4. Generally, the outer stem portion is in the position of FIG. 4 when the valve is being turned. As a result, there is a minimum of torque required to turn the valve and the torque remains fairly constant because of the relatively large bearing surface between the rotatable washer 24 and the cap 29.

In order to unlock the valve 10, the stem 16 is axially moved to the left (as viewed in FIGS. 1, 3 and 4) by depressing or moving the knob 17 to the left against the force of the spring 26 until the locking tongue 38 is moved from and is clear of the locking recess 39 in the end plate 29. In this position, as shown in dotted lines in FIG. 3, the right or outer surface 28b of the locking washer is in flush engagement with the staking 16e and spaced slightly from the left or inner surface 24c of the washer 24. The stem 16, while in its left axial position, is then rotated to move the tongue 38 out of registry with the recess 39 in end plate 29 so that the tongue end 38a overlies the plate surface 29a adjacent to the recess 39. Thereafter, the stem 16 is released, whereupon the right or outer stem portion is moved back toward its right extreme position under the influence of the spring 26 until plate 24 engages the left or inner surface 29a of the end plate 29. During this movement, the end 38a of the tongue 38 engages the surface 29a of the plate 29 thereby causing the washer 28 to pivot about the tongue. Accordingly, the body of the washer 28 is again disposed in a tilted position relative to the flange 24 so that the washer 28 only engages the staking and the plate 29 at its tongue tip 38a, as best shown in FIG. 3.

With the stem 16 unlocked from the plate 29 and the stem assembly in the position shown in FIG. 4, the washer 28 is driven by the stem 16 and is rotated in its tilted position through all of the valve positions except the off position without interfering with the operation of the valve. In the off position the locking tongue again enters the locking recess.

While a particular embodiment of the invention has been shown, it will be understood, of course, that the invention is not limited thereto since many modifications may be made and it is, therefore, contemplated by the appended claims to cover any such modifications as fall within the true spirit and scope of the invention. For example, the inner stem portion could be made hollow

What is claimed as new and desired to be secured by Letters Patent of the United States is:

1. In a locking type gas valve comprising a valve element movable between off and a plurality of on positions, a valve element rotating stem assembly including a first and inner portion having a cylindrical exterior and connected to the element, said first portion having an annular groove spaced inwardly from its outer end, a pin mounted in the region of said groove, and having its opposite ends extending radially outwardly beyond the stem, a second and outer tubular stem portion fitted movably but relatively closely around said first portion, said second portion having axially extending diametrically opposite slots into which the opposite ends of said pin fit relatively closely but movably, the outer ends of said slots being engageable with said pin to determine the extent of inward axial movement of the outer portion relative to the inner portion, said gas valve having a centrally apertured end plate fitting around the outer of said stem portions, a position limiting washer fixedly secured to the inner end of said outer stem portion and adapted to abut against the inner surface of said end plate, said washer having inwardly extending tongues extending into said diametrically opposed slots, a locking washer loosely surrounding the inner stem portion adjacent the inside of said position limiting washer, the position limiting washer having a peripheral slot and said locking washer having an axially extending tongue extending into said slot and having a length greater than the thickness of said washer, said end plate having a locking aperture into which said tongue extends in the off position of said valve element, and a spring on the inner stem portion biasing said locking washer and said position limiting washer toward the inside of said end plate.

2. In a locking type gas valve as claimed in claim 1, wherein said position limiting washer is fixedly staked at the region of the opening therein to the inner end of said outer stem portion and said staking extends axially inwardly beyond said washer a short distance, and said locking washer abuts against said staking.

3. In a locking type gas valve comprising a valve element movable between off and a plurality of on positions, a valve element rotating and locking stem assembly connected to said element, said assembly comprising a first stem portion connected to the valve element, a second and outer stem portion telescopically mounted on the first for relative axial movement, a driving connection between the two stem portions including a pin and slot driving connection said connection including a slot having one closed end and the pin extending into the slot, and a limit position determining washer secured to the end of said outer stem portion and including structure extending into said slot at the side of the pin opposite said closed end, thereby effectively to close that end of the slot and to confine the pin in said slot to maintain the two stem portions in telescopic assembled relation.

4. In a locking type gas valve as claimed in claim 3, a locking washer encircling and relatively loosely mounted on said first stem portion and having an axially extending locking tongue, and an end plate mounted adjacent said first mentioned washer and having a locking recess into which said tongue projects in the off position of the valve element.

5. In a locking type gas valve comprising a valve element movable between off and a plurality of on positions, a valve element rotating and locking means connected to said element, said means including an inner cylindrical stem portion and an outer tubular stem portion, said stem portions being connected for simultaneous rotation and being telescopically arranged relative to each other over a substantial length, a locking washer loosely encircling and mounted on said cylindrical stem portion and acting against the inner end of said tubular stem portion, said valve having a locking recess, said locking washer having a single axially extending locking projection disposed in said recess in the locked position of the valve, said projection being adapted to bear against a part of the valve and the washer leaning against the inner end of the tubular stem portion in unlocked positions of the valve, means including a drive washer staked to the inner end of the tubular stem portion and drivingly connected to said projection providing a driving connection between said stem portion and the projection on the locking washer, and spring means surrounding said cylindrical stem portion and biasing said locking washer against the end of the tubular stem portion and said drive washer against the valve, the said staking being disposed close to the exterior of said cylindrical stem portion and projecting beyond the drive washer and constituting the inner end of said tubular stem portion and said locking washer bearing against it in both its locked and unlocked positions.

References Cited in the file of this patent

UNITED STATES PATENTS

| | | |
|---|---|---|
| 1,933,177 | Kindl | Oct. 31, 1933 |
| 2,035,762 | Roberts | Mar. 31, 1936 |
| 2,243,128 | Rutherford | May 27, 1941 |
| 2,634,949 | Robinson | Apr. 14, 1953 |
| 2,652,226 | Huff | Sept. 15, 1953 |
| 2,723,102 | Mueller | Nov. 8, 1955 |

FOREIGN PATENTS

| | | |
|---|---|---|
| 495,476 | Great Britain | Nov. 14, 1938 |
| 502,691 | Great Britain | Mar. 22, 1939 |
| 905,035 | France | Mar. 26, 1945 |